United States Patent [19]

Toda et al.

[11] Patent Number: 5,360,827
[45] Date of Patent: Nov. 1, 1994

[54] PROCESS FOR PREPARATION OF LATEX OF HOLLOW POLYMER

[75] Inventors: Hideki Toda, Kamakura; Yukio Takagishi, Kawasaki; Masaru Kaino, Kamakura, all of Japan

[73] Assignee: Nippon Zeon Co., Ltd., Tokyo, Japan

[21] Appl. No.: 40,006

[22] Filed: Mar. 30, 1993

[30] Foreign Application Priority Data

Mar. 31, 1992 [JP] Japan .................................. 4-108770
Feb. 22, 1993 [JP] Japan .................................. 5-056519

[51] Int. Cl.$^5$ .......................... C08J 9/22; C08K 3/20; C08L 83/00; C08F 265/02
[52] U.S. Cl. ...................................... 521/57; 523/201; 521/61; 521/63; 521/64; 524/460; 525/301; 525/902
[58] Field of Search ................ 525/301, 902; 524/460; 523/201; 521/61, 63, 64, 57

[56] References Cited

U.S. PATENT DOCUMENTS

| | | | |
|---|---|---|---|
| 4,427,836 | 1/1984 | Kowalski et al. | 525/301 |
| 4,468,498 | 8/1984 | Kowalski et al. | 525/301 |
| 4,910,229 | 3/1990 | Okubo et al. | 521/72 |
| 5,077,320 | 12/1991 | Touda et al. | 521/65 |

*Primary Examiner*—Paul R. Michl
*Assistant Examiner*—Patrick Niland
*Attorney, Agent, or Firm*—Sherman and Shalloway

[57] ABSTRACT

A process for preparation of latex of a hollow polymer which comprises adding a base, in the presence of a monomer, to latex containing carboxy-modified copolymer particles to make the pH of the latex 8 or more; adding a carboxyl group-containing monomer to make the pH of the latex 7 or less; and then polymerizing these monomers.

12 Claims, No Drawings

PROCESS FOR PREPARATION OF LATEX OF HOLLOW POLYMER

This invention relates to a process for preparation of latex containing hollow polymer particles (hollow polymer latex). More detailedly, this invention relates particularly to a process for preparing stably latex which contains hollow polymer particles having a high glass transition temperature and has only a small residual odor.

Hollow polymer particles obtained by this invention can be used as an organic pigment, a heat insulator, an opaquer, etc. in the fields of water paints, paper-coating compositions, etc.

Heretofore, latex containing hollow polymer particles has been used for uses of water paint compositions, paper-coating compositions, etc.

When hollow polymer particles are used as a component of a water paint and formed into a coat, since the hollow polymer particles have hollows (air layers) in particles insides their insides, and thus they have many interfaces between air and polymer particles which have largely different refractive indexes of light, and as a result, scattering of light occurs, and the opacity and shielding property of the coat increase. Thus, hollow polymer particles are utilized as an opacifying agent, or a white pigment excellent in optical properties such as opacity and whiteness Further, when hollow polymer particles are used as a component of a paper-coating composition, they also have an effect to enhance optical properties such as the opacity, whiteness, etc. of coated paper, by the same reason as in the case of a water paint. As a process for preparation of hollow polymer particles, there has hitherto been proposed, for example, in U.S. Pat. Nos. 4,427,836 and 4,468,498 a process which comprises copolymerizing an ethylenically unsaturated monomer with a carboxyl group-containing ethylenically unsaturated monomer by emulsion polymerization to prepare seed particles (core part); carrying out cover polymerization using an ethylenically unsaturated monomer, for formation of the particle surface layer (shell part); neutralizing, after completion of polymerization, the resultant particles with a volatile base such as ammonia; and swelling the particles into hollow particles. In this process, two stage polymerization is carried out so as to make the polymer compositions of the core part and the shell part different, and thus the steps are complicated. Further, in this process, it is important to carry out cover polymerization only on the seed particle surface layers, and therefore, it is difficult to control reaction temperature, the quantity of the polymerization initiator, the quantity of the surfactant, etc., and thus it is difficult to form hollow particles stably.

Japanese Laid-Open Patent Publication No. 1704/1989 discloses a process which comprises adding a base to carboxyl group-containing copolymer latex to neutralize at least part of the carboxyl groups in the copolymer (base treatment), and then lower the pH of the latex with an acid (acid treatment) to produce hollow particles. In this process, it is necessary to neutralize the carboxyl groups in the polymer particles, and in order to make the base necessary for neutralization permeate sufficiently into the polymer particles, there is a necessity to raise treatment temperature from a temperature somewhat lower than the glass transition temperature (Tg) of the polymer to a temperature equal to or more than Tg and raise the diffusion rate of the base. Therefore, it is impossible to settle Tg of the polymer too high, and thus the resultant hollow polymer particles, when used in a coating composition followed by a drying step with heating, do not exhibit optical properties such as sufficient whiteness and opacity, and are poor in usefullness as a white pigment.

A process is proposed in U.S. Pat. No. 5,077,320 which comprises making an organic solvent to be contained in the latex, at the time of polymerization of carboxy-modified copolymer particles, or at the stage of base treatment after polymerization, to prepare hollow particles. In this process, a step for removal of the added organic solvent is necessary, after acid treatment, and moreover there is a problem that the odor of the organic solvent still remains after the removal.

An object of this invention lies in providing a process for preparation of latex of a hollow polymer which makes it possible to prepare stably latex containing hollow polymer particles, particularly including latex containing hollow polymer particles having a high glass transition temperature.

Another object of this invention lies in providing latex of a hollow polymer having only a small residual odor.

The present inventors found that the above objects can be attained by making a base treatment during polymerization of carboxy-modified copolymer particles, or after polymerization, in the presence of a monomer; carrying out an acid treatment using a carboxyl group-containing monomer to form hollow particles, and then polymerizing the unreacted monomer mixture existing in the system.

Thus, according to this invention is provided a process for preparation of latex of a hollow polymer which comprises adding a base, in the presence of a monomer, to latex containing carboxy-modified copolymer particles to make the pH of the latex 8 or more; adding a carboxyl group-containing monomer to make the pH of the latex 7 or less; and then polymerizing these monomers.

Copolymer particles used in this invention necessarily contain carboxyl groups, but there is no limitation on other monomer composition so long as they are copolymer particles containing carboxyl groups.

As a process for introduction of carboxyl groups into polymer particles, a process is preferable which comprises copolymerizing a carboxyl group-containing monomer with another monomer. As carboxyl group-containing monomers, there can be exemplified unsaturated carboxylic acids such as acrylic acid, methacrylic acid, crotonic acid, cinnamic acid, itaconic acid, fumaric acid, maleic acid and butenetricarboxylic acid; unsaturated dicarboxylic acid monoalkyl esters such as itaconic acid monoethyl ester, fumaric acid monobutyl ester and maleic acid monobutyl ester; etc. These carboxyl group-containing monomers can be used alone respectively, or in combination of two or more. Particularly preferable are unsaturated carboxylic acids such as acrylic acid, methacrylic acid and itaconic acid.

As other monomers used in this invention, there can, for example, be mentioned aromatic vinyl monomers such as styrene, α-methylstyrene, p-methylstyrene, halogenated styrene and divinylbenzene; unsaturated nitrile monomers such as acrylonitrile; unsaturated (meth)acrylic ester monomers such as methyl (meth)acrylate, ethyl (meth)acrylate, butyl (meth)acrylate, 2-ethylhexyl (meth)acrylate, lauryl (meth)acrylate and glycidyl (meth)acrylate; diene monomers such as butadiene and isoprene; etc. Besides them, there can further be exemplified monomers copolymerizable with the above carboxyl group-containing monomers, for example, vinylpyridine, vinylidene chloride, (meth)acrylamide, N-methylol (meth)acrylamide, 2-hydroxyethyl (meth)acrylate, diallyl phthalate, allyl (meth)acrylate and vinyl acetate. Particularly preferable are aromatic vinyl monomers such as styrene and divinylbenzene, and unsaturated (meth)acrylic ester monomers such as methyl (meth)acrylate and butyl acrylate.

When a carboxyl group-containing monomer is copolymerized with another monomer to prepare latex containing copolymer particles, it is preferable that the quantity of the carboxyl of group-containing monomer is, usually, in the range of 0.1 to 40 wt. % of the mixture of the total monomers. In case this use rate is below 0.1 wt. %, it is hard to swell the polymer particles with base treatment, and on the other hand, in case it is above 40 wt. %, a coagulate is liable to occur at the time of polymerization. More preferably, this quantity is 0.5 to 20 wt. %.

As processes for introduction of the carboxyl groups of the carboxyl group-containing copolymer particles, it is also possible, besides the above process comprising copolymerizing a carboxyl group-containing monomer, to adopt to process comprising carboxylating a copolymer by a post-treatment.

Preferable as carboxy-modified copolymer particles used in the process of this invention are polymer particles having three layer structure comprising center layer polymer ①, an intermediate layer polymer ② and a surface layer polymer ③ wherein the use rates of the carboxyl group-containing monomer are different with one another. By use of these, it is possible to obtain hollow polymer particles each having a shell thickness of 50 nm or less and a high percentage of void.

The center layer polymer ① forms the core part of the polymer particles. The center layer polymer is formed by copolymerizing a monomer mixture of 20 to 60 wt. % of a carboxyl group-containing monomer and 80 to 40 wt. % of a monomer copolymerizable therewith. The center layer polymer is spherical, and formed preferably by a process which comprises preparing seed particles in advance and copolymerizing the monomer mixture in the presence of the seed particles.

Each monomer can be used solely or in a combination of two or more. The polymerization conversions are on the order of usually 90 to 99 wt. %, preferably 97 to 99 wt. %, and the composition of the resultant copolymer (the rates of each monomer unit in the molecule) in almost the same with the composition of the used monomers.

The quantity of the carboxyl group-containing monomer in the monomer mixture is 20 to 60 wt. %, preferably 30 to 50 wt. %. When this quantity is below 20 wt. %, in the base treatment step (a step wherein the pH of the latex is made to be 8 or more by addition of a base), it becomes difficult for the base to permeate into the polymer particles, and the shell thickness of the hollow polymer particles becomes thick. On the other hand, this quantity goes beyond 60 wt. %, at the time of polymerization of the polymer particles or at the time of base treatment thereof, the center layer polymer moves outside the intermediate layer and the surface layer polymer, and wraps up the intermediate layer and the surface layer polymer and as a result a hollow state is not obtained.

The distribution at the radius direction of the carboxyl group-containing monomer unit in the center layer polymer is not particularly limited. However, when a distribution occurs at the radius direction in the content of the carboxyl group-containing monomer unit, for example when copolymerization is carried out by addition of the monomer mixture to the polymerization reaction system while the composition of the monomer mixture is gradually changed, it is preferable that a part in the distribution wherein the carboxyl group-containing monomer unit is the least contains 10 wt. % or more, preferably 15 wt. % or more of the carboxyl group-containing monomer unit based on the total monomer units forming the part. When this quantity is under 10 wt. %, there arises a case where small particles are formed in the inside holes of the hollow polymer particles, and the percentage of void lowers.

The intermediate layer polymer ② wraps up the center layer polymer, and is put between the center layer polymer ① and the surface layer polymer ③. The intermediate layer polymer is formed as a layer to wrap the center layer polymer particles by copolymerizing, in the presence of the center layer polymer particles, a monomer mixture of 1 to 12 wt. % of a carboxyl group-containing monomer and 99 to 88 wt. % of a monomer copolymerizable therewith.

Each monomer can be used solely or in a combination of two or more. The conversions of these monomers are on the order of usually 90 to 99 wt. %, preferably 97 to 99 wt. %, respectively, and the composition of the resultant copolymer (the rate of each monomer unit) is almost the same with the composition of the used monomers.

The quantity of the carboxyl group-containing monomer in the monomer mixture is 1 to 12 wt. %, preferably 2 to 10 wt. %. When this quantity is under 1 wt. %, the shell thickness of the resultant hollow polymer particles become thick. On the other hand, when this goes beyond 12 wt. %, condition control becomes difficult in the base treatment step and the acid treatment step (a step to make the pH of the latex 7 or less by addition of an acid), and it is impossible to obtain hollow polymer particles stably.

The weight ratio of the center layer polymer ① to the intermediate layer polymer ② (①:②) is usually 1:99 to 50:50, preferably 2:98 to 30:70. When the quantity of the center layer polymer is too small, it is difficult for the base to permeate at the time of the base treatment, and the shell thickness becomes thick. On the other hand, the quantity is too large, the center layer polymer moves outside the intermediate layer polymer and the surface layer polymer and wraps the intermediate layer and surface layer polymers, and as a result, hollows are not formed.

The distribution at the radius direction of the carboxyl group-containing monomer unit in the intermediate layer polymer is not particularly limited. However, when a distribution occurs at the radius direction in the content of the carboxyl group-containing monomer unit, for example, when copolymerization is carried out addition of the monomer mixture to the polymerization reaction system while the composition of the monomer mixture is gradually changed, it is preferably that a part in the distribution wherein the carboxyl group-containing monomer unit is the least contains 0.1 wt. % or more. When there is a part not containing the carboxyl group-containing monomer unit, there arises a case where small particles are formed in the inside holes of the hollow polymer particles, and the percentage of void lowers.

The surface layer polymer ③ is formed wrapping up the center layer polymer ① and the intermediate layer polymer ②, and forms the outermost surface part. The surface layer polymer is formed, by copolymerizing a monomer containing no carboxyl group in the presence of the polymer particles having the center layer and intermediate layer polymers, as a layer wrapping the particles. As monomers containing no carboxyl group, one or two or more of monomers can be used in combinations.

The weight ratio of the total quantity of the center layer polymer and the intermediate layer polymer to the surface layer polymer [(①+②):③] is 30:70 to 70:30, preferably 40:60 to 60:40. When the weight ratio of the surface layer polymer is too large, it becomes difficult for the base to permeate at the time of the base treatment, and the shell thickness becomes thick. On the other hand, the weight ratio of the surface layer polymer is too small, the center layer and intermediate layer polymers move outside the surface layer polymer and wrap the surface layer polymer, and as a result, hollows are not formed.

A latex containing carboxy-modified copolymer particles used in this invention is, usually, one prepared by an emulsion polymerization method, but may be one obtained by making a copolymer obtained by another polymerization method into a latex by a phase inversion method. Polymerization methods are not limited, and a known polymerization method is used such as a batch type, semi-continuous or continuous polymerization method. Polymerization temperature is not particularly limited, either, and any of a high temperature and a low temperature can be selected.

Further, a latex of polymer particles, as carboxy-modified copolymer particles, having three-layer structure can be prepared by the following preparation method.

The center layer polymer ① can be obtained by a usual emulsion polymerization method, or by polymerizing in advance part of the monomer mixture to obtain seed particles, and the copolymerizing the residual monomer mixture in the presence of the seed particles to coat the particles with the resultant copolymer (seed coating polymerization). Alternatively, the center layer polymer ① can also be prepared by copolymerizing another monomer mixture to obtain seed particles, and then copolymerizing the above monomer mixture, in the presence of the seed particles, to coat the seed particles.

The intermediate layer polymer ② can be prepared by making seed coating polymerization using the center layer polymer ① as seed particles. The surface layer polymer ③ can be prepared by making seed coating polymerization using, as seed particles, polymer particles having the center layer and intermediate layer polymers.

Each of the above polymerization stages may be carried out continuously using the same reactor, stepwise using separate reactors. Polymerization conversions at the time of completion of polymerization at the respective polymerization stages are usually 90 to 99 wt. %, preferably 97 to 99 wt. %. When the polymerization conversion is under 90%, there is a case where the shell thickness of the hollow polymer particles becomes thick. As a method for addition of each monomer, monomer addition or emulsion addition is preferable.

Polymerization submaterials used in preparation of carboxy-modified copolymer particles used in this invention are not particularly limited so long as they are used in known polymerization, and there can be used various additives such as various emulsifiers, polymerization initiators, chelating agents and electrolytes.

In this invention, hollow polymer particles are prepared by adding a base to the above latex containing the polymer particles to make the pH of the latex 8 or more (base treatment step), and then adding an acid to make the pH of the latex 7 or less (acid treatment step).

In this invention, first, the base is added to the carboxy-modified copolymer latex, in the presence of a monomer, to the pH of the latex 8 or more. The carboxy-modified copolymer latex is prepared, usually, by an emulsion polymerization method. When polymerization conversion is low, it is not always necessary, in the base treatment step, to add the monomer additionally (post addition), but when polymerization conversion is high and the residual quantity of the monomer in the reaction system is small, the monomer is post added. By carrying out the base treatment in the presence of the monomer, polymer particles are softened and diffusion of the base is promoted.

The monomer post-added to the carboxy-modified copolymer latex is one softening the polymer particles in the latex, and a monomer containing no carboxyl group. As specific examples, there can be mentioned those the same with the above other monomers. It is preferable that the rate of the monomer post-added to the carboxy-modified copolymer latex is in the range of usually 1 to 20 weight parts per 100 weight parts of the carboxy-modified copolymer particles (former polymer particles). When this rate is under one weight part, softening of the polymer particles is slow to occur, and even when it occurs, its effect is small. When this use rate is above 20 weight parts, much coagulate of the polymer particles occurs. Further preferred use rate is 2 to 10 weight parts. When the addition quantity of the monomer is increased within this range, it becomes possible to soften the polymer particles at a lower temperature.

When a carboxy-modified copolymer latex is prepared by an emulsion polymerization method, it is at a stage where polymerization conversion become usually 83 to 99% to carry out the base treatment. When it is desired to make a base treatment at a lower temperature, it is sufficient to lower polymerization conversion. When polymerization conversion is on the order of 83 to 95%, even in case of no post-addition of the monomer, unreacted monomer remains in a ratio in quantity of some extent, and therefore, even only by addition of the base during polymerization, diffusion of the base into the polymer particles is promoted. When polymerization conversion is above 95% and 99% or less, it is desirable to post-add to monomer appropriately with the above range.

When polymerization conversion is above 99% at the stage of the base treatment, even by post-addition of the monomer at the stage of the base treatment, it becomes difficult to soften polymer particles, and the diffusion rate of the base is not accelerated. The preferred upper limit of polymerization conversion is 98%. When polymerization conversion is under 83%, the polymer particles tend to aggregate at the time of the acid treatment.

Addition of the base may be before or after or at the same time of addition of the monomer to be post-added. Usable bases are not particularly limited, and, for example, there can be exemplified alkali metal hydroxides such as sodium hydroxide, potassium hydroxide and lithium hydroxide; ammonia; amine compounds such as dimethylamine and diethanolamine; etc. The use quantity of the bases is a quantity enough to neutralize at least part of the carboxyl group quantity in the polymer in the carboxy-modified copolymer latex, namely a quantity such that the pH of the latex becomes 8 or more, preferably 10 or more.

For the purpose of neutralizing the carboxyl groups inside the polymer particles after addition of the base to the latex, time is necessary for the base to diffuse inside the polymer particles, and it is preferable to make, after addition of the base, adequate stirring for a sufficient time. It is preferable that the treatment temperature in the base treatment is a temperature equal to or higher than a temperature capable of softening the polymer particles sufficiently. Treatment time after addition of the base is usually 10 minutes or more, preferably 30 minutes or more, more preferably 1 hour or more. The stability of the system lowers by addition of the base, but in order to prevent this, it is possible, before addition of the base, to add anionic surfactants or nonionic surfactants alone or in combination.

In this invention, after the above base treatment, a carboxyl group-containing monomer is added to make the pH of the latex 7 or less, preferably 6 or less (acid treatment).

Carboxyl group-containing monomers used in this invention are not particularly limited, and, for example, there can be exemplified unsaturated mono- or poly-carboxylic acids such as acrylic acid, methacrylic acid, crotonic acid, cinnamic acid, itaconic acid, fumaric acid, maleic acid and butenetricarboxylic acid; unsaturated dicarboxylic acid monoalkyl esters such as itaconic acid monoethyl ester, fumaric acid monobutyl ester and maleic acid monobutyl ester; etc. The use rate of the carboxyl group-containing monomer is in the range of usually 0.5 to 20 weight parts, preferably 1 to 10 weight parts per 100 weight parts of the carboxy-modified copolymer particles (former polymer particles). In the acid treatment, it is possible to make a carboxyl group-containing monomer and a monomer copolymerizable therewith coexist. These copolymerizable monomers are used in the range of usually 70 weight parts or less, preferably 60 weight parts or less per 100 weight parts of the polymer particles.

Treatment temperature, treatment time, etc. in the acid treatment step are almost the same with the conditions of the base treatment. Stability of the latex lowers by addition of an acid, and for prevention thereof, it is possible, before addition of the acid, to add an anionic surfactant or a nonionic surfactant alone or in combination.

After the acid treatment, the monomer post-added in the base treatment step or in the acid treatment step or unreacted monomer is polymerized. The polymerization method is not particularly limited, and for example, the polymerization is carried out by addition of a polymerization initiator.

The reason why the polymer particles are converted into hollow ones is not certain at this stage, but the hollow phenomenon can be ascertained, for example by observation of the form of the resultant polymer particles through a transmission type electron microscope. When the polymer particles are observed in an intermediate stage of the acid treatment by a transmission type electron microscope, it can be ascertained that polymer particles have, at first, several small holes, respectively, and with progress of the treatment these small holes gather to form a uni-hollow particle. Namely, it is possible, according to the process of this invention, to obtain, in accordance with treatment conditions, any of multi-hollow particles each having plural small holes and uni-hollow particles each having a single hole. The number of hollows and the aperture of hollows can be controlled by the quantity of carboxyl groups, the distribution of the carboxyl groups, the hydrophilic property of polymer particles, base treatment conditions, acid treatment conditions, polymerization conversion at the time of initiation of such treatment, addition quantity of a monomer, etc.

This invention is specifically described below according to examples and comparative examples, but this invention is not limited only to these examples. Unless otherwise defined, parts and % are based on weight. Further, all polymerizations were conducted in an atmosphere of nitrogen as an inert gas.

The mean particle size and mean inner hole diameter of hollow polymer particles were measured by observation of the hollow polymer particles through a transmission type electron microscope, and determined as mean values on 20 particles. The shell thickness was calculated based on these mean values.

EXAMPLE 1

Preparation of copolymer latex A1

A reactor comprising a four-necked flask was equipped with a reflux condenser, a thermometer and a separating funnel, and 200 parts of deionized water was put therein and the mixture was heated to 80° C. In another vessel, a monomer mixture of 30 parts of deionized water, 0.2 part of sodium dodecylbezensulfonate, 93 parts of styrene and 7 parts of methacrylic acid was stirred to prepare an emulsion.

5 Parts of 3% aqueous solution of potassium persulfate (KPS) was added to the reactor from the separatory funnel. Further, 20 parts of 3% KPS aqueous solution was put in the separating funnel, and an adjustment was made so as to add it continuously over a period of 8 hours. The previously prepared emulsion was transferred to other separatory funnel, and an adjustment was made so as to add it from the separating funnel over a period of 8 hours. Further, reaction was carried out for 2 hours.

Polymerization conversion was 98% at this stage, and pH measured was 2.3. Part of the latex was taken, and the particle size of the polymer was measured by a transmission type electron microscope to be 450 nm. The thus obtained copolymer latex was designated (A1).

Preparation of hollow polymer latex

In order to soften the polymer particles, 5 parts of styrene was post-added from the separating funnel. Immediately thereafter, 44 parts of 10% potassium hydroxide aqueous solution was added from the separatory funnel, and thereafter the mixture was heated to 80° C. and was treated for 3 hours (base treatment), Part of the latex was taken at this stage, and the pH was measured at room temperature to be 12.3.

Thereafter, 140 parts of aqueous 5% methacrylic acid solution was added, and the mixture was stirred at 80° C. for 3 hours (acid treatment). Thereafter, 10 parts of aqueous 3% KPS solution was added, the mixture of unreacted monomers existing in the system was stirred for 2 hours to carry out polymerization, and then the mixture was cooled to room temperature.

Polymerization conversion at this final stage was 99% and pH was 5.5. The particle size of the polymer particles and hollows in the polymer particles insides were observed by a transmission type electron microscope (TEM). The results were shown in Table 1. The hollow polymer latex was subjected to steam distillation to remove the residual monomer. Assessment on odors was shown in Table 1, too.

EXAMPLE 2

Copolymer latex (A1) was prepared in the same manner as in Example 1. In order to soften the polymer particles, 5 parts of styrene was post-added from the separating funnel. Immediately thereafter, 46 parts of aqueous 10% potassium hydroxide solution was added from the separating funnel, and, thereafter, the mixture was heated to 80° C. and treated for 3 hours (base treatment). Part of the mixture was taken at this stage, and pH was measured at room temperature to be 12.3.

Then, 106 parts of aqueous 5% itaconic acid was added, and the mixture was stirred at 80° C. for 3 hours (acid treatment). Thereafter, 10 parts of aqueous 3% KPS solution was added, the mixture of unreacted monomers was stirred for 2 hours to carry out polymerization, and then the mixture was cooled to room temperature.

Polymerization conversion at this final stage was 99% and pH was 5.5. The results were shown in Table 1. The hollow polymer latex was subjected to steam distillation to remove the residual monomer. Assessment on odors was shown in Table 1, too.

EXAMPLES 3 AND 4 AND COMPARATIVE EXAMPLES 1 AND 2

Copolymer latex (A1) was prepared in the same manner as in Example 1. Treatment was carried out in the same manner as in Example 1 except that conditions shown in Table 1 were adopted on post addition, base treatment and acid treatment. The results were shown in Table 1.

EXAMPLE 5

A copolymer latex (A2) was prepared, as shown in Table 1, by emulsion polymerization using 63 parts of styrene, 30 parts of methyl methacrylate and 7 parts of methacrylic acid as a monomer mixture. Example 1 was repeated except for use of the latex (A2) instead of the latex (A1). The results are shown in Table 1.

EXAMPLE 6

A copolymer latex (A3) was prepared, as shown in Table 1, by emulsion polymerization using 94 parts of styrene, and 6 parts of methacrylic acid as a monomer mixture. Example 1 was repeated except for use of the latex (A3) instead of the latex (A1). The results are shown in Table 1.

EXAMPLE 7

A copolymer latex (A4) was prepared, as Shown in Table 1, by emulsion polymerization using 8.7 parts of styrene, 5 parts of methylmethacrylate, 7 parts of methacrylic acid and 0.3 part of divinylbenzene as a monomer mixture. Example 1 was repeated except for use of the latex (A4) instead of the latex (A1). The results are shown in Table 1.

TABLE 1

| | | | A1 | A2 | A3 | A4 |
|---|---|---|---|---|---|---|
| polymerization step | Monomer | Styrene | 93 | 63 | 94 | 87.7 |
| | | Methyl methacrylate | — | 30 | — | 5 |
| | | Acrylic acid | — | — | 6 | — |
| | | Methacrylic acid | 7 | 7 | — | 7 |
| | | Divinylbenzene | — | — | — | 0.3 |
| | Addition time (hrs) | | 8 | 8 | 8 | 8 |
| | Post-polymerization time (hrs) | | 2 | 2 | 2 | 2 |
| | Result | Polymerization conversion (%) | 98 | 98 | 97 | 97 |
| | | TEM particle size (nm) | 450 | 440 | 460 | 480 |
| | | pH | 2.3 | 2.3 | 2.3 | 2.3 |

| | | | Example | | | | Comparative example | | Example | | |
|---|---|---|---|---|---|---|---|---|---|---|---|
| | | | 1 | 2 | 3 | 4 | 1 | 2 | 5 | 6 | 7 |
| Treatment step | Post-addition | Methyl ethyl ketone | — | — | — | — | — | 30 | — | — | — |
| | | Styrene | 5 | 5 | — | — | — | — | 5 | 5 | 5 |
| | | Methyl methacrylate | — | — | 5 | 4.5 | — | — | — | — | — |
| | | Divinylbenzene | — | — | — | 0.5 | — | — | — | — | — |
| | Base treatment | Potassium hydroxide | 4.4 | 4.4 | 4.4 | 4.4 | 4.4 | 4.4 | 4.4 | 4.4 | 4.4 |
| | | Treatment time (hrs) | 3 | 3 | 3 | 3 | 3 | 3 | 3 | 3 | 3 |
| | Acid treatment | Methlacrylic acid | 7 | — | 7 | 7 | — | 7 | 7 | 7 | 7 |
| | | Itaconic acid | — | 5.3 | — | — | 5.3 | — | — | — | — |
| | | Sulfuric acid | — | — | — | — | — | 4.0 | — | — | — |
| | | Treatment time (hrs) | 3 | 3 | 3 | 3 | 3 | 3 | 3 | 3 | 3 |
| Post-polymerization reaction | Polymerization time (hrs) | | 2 | 2 | 2 | 2 | 2 | 2 | 2 | 2 | 2 |
| | KPS (weight part) | | 0.3 | 0.3 | 0.3 | 0.3 | 0.3 | 0.3 | 0.3 | 0.3 | 0.3 |
| Result | pH at base treatment | | 12.3 | 12.3 | 12.5 | 12.5 | 12.5 | 12.5 | 12.3 | 12.3 | 12.3 |
| | pH after acid treatment | | 5.5 | 5.5 | 5.5 | 5.5 | 5.3 | 5.5 | 5.3 | 5.5 | 5.5 |
| | Mean particle size (nm) | | 510 | 480 | 510 | 510 | 450 | 480 | 460 | 490 | 500 |
| | Mean small hole diameter (nm) | | 170 | 80 | 130 | 150 | small hole | 100 | 80 | 150 | 180 |
| | Small hole number (number) | | 1–4 | >10 | 1–7 | 1–4 | none | 2–3 | 2–3 | 2–8 | 2–8 |
| | Tg (°C.) | | 105 | 105 | 105 | 110 | 105 | 105 | 108 | 104 | 110 |
| | Treatment stability | | ○ | ○ | ○ | ○ | X | ○ | ○ | ○ | ○ |

TABLE 1-continued

| Residual odor | ○ | ○ | ○ | ○ | ○ | X | ○ | ○ | ○ |

(Table 1 footnote)
(1) Treatment stability
○: Hollow particles are formed stably.
X : Hollow particles are not formed, or polymer particles aggregate.
(2) Odor
○: There is no odor, or a slight odor remains.
X : There is a strong solvent odor.
(3) Tg
Tg was measured under conditions of a temperature rise speed of 10° C./min and an initiation temperature of −100° C. using a differential scanning calorimeter.

As apparent from Table 1, it is possible, according to the preparation process of this invention (Examples 1 to 7), to obtain a hollow polymer latex stably. On the other hand, when a polymerizable monomer was not added in the base treatment (comparative example 1), it is impossible to obtain a hollow polymer latex. Further, when an organic solvent is used in the base treatment (Comparative example 2), an odor remains.

EXAMPLE 8

Process for carrying out base treatment and acid treatment in the middle of polymerization A four-necked flask was equipped with a reflux condenser, a thermometer and a separatory funnel, and 200 parts of deionized water was put therein and the mixture was heated to 80° C. In other vessel, 30 parts of deionized water, 0.2 part of sodium dodecylbenzensulfonate, 93 parts of styrene and 7 parts of methacrylic acid was stirred to prepare an emulsion. Thereafter, 5 parts of aqueous 3% KPS solution was added to the reactor from the separatory funnel.

The previously prepared emulsion was transferred to other separatory funnel, and an adjustment was made so as to add it from the separatory funnel over a period of 8 hours, and polymerization was initiated. Polymerization conversion was 90% in the middle of addition of the emulsion. Immediately after completion of the addition, 44 parts of aqueous 10% potassium hydroxide solution was added from the separatory funnel, and thereafter the mixture was heated to 80° C. and treated for 3 hours (base treatment). Part of the latex was taken at this stage, and the pH was measured at room temperature to be 12.3.

Thereafter, 140 parts of aqueous 5% methacrylic acid solution was added, and the mixture was stirred at 80° C. for 3 hours (acid treatment). Thereafter, 10 parts of aqueous 3% KPS solution was added, the mixture of unreacted monomers was stirred for 2 hours to carry out polymerization, and then the mixture was cooled to room temperature.

Polymerization conversion at this final stage was 99% and pH was 5.5. As a result, the mean particle size was 520 nm, the mean small hole diameter was 180 nm, the small hole number was 1 to 4 and the measured Tg was 106 ° C.

EXAMPLE 9

60% of methyl methacrylate (MMA), 5% of butyl acrylate (BA) and 35% of methacrylic acid (MAA) were mixed to prepare 5 parts of a monomer mixture (a) for formation of a center layer polymer.

Separately, 85% of MMA, 10% of BA and 5% of metha-acrylic acid (MAA) were mixed to prepare 45 parts of a monomer mixture (b) for formation of an intermediate layer polymer. Separately, 95% of styrene (ST) and 5% of MMA were mixed to prepare 50 parts of a monomer mixture (c) formation of a surface layer.

400 parts of deionized water, 0.3 part of monomer mixture (a) and 0.3 part of an emulsifier (sodium dodecylbenzene sulfate) were put in a reactor equipped with a stirring apparatus, a reflux condenser, a thermometer and a separating funnel, and the mixture was heated to 80° C. and stirred to prepare an emulsion.

Then, 7 parts of aqueous 3% potassium sulfate (KPS) solution was added from the separating funnel, and the mixture was subjected to polymerization at 80° C. for 0.5 hour to obtain seed particles. Thereafter, 0.5 part of an emulsifier was added, the residual monomer mixture (a) was continuously added over a period of one hour, and polymerization was carried out for 2 hours. The conversion of monomer mixture (a) was 98%. Then, after addition of 7 parts of KPS, monomer mixture (b) was continuously added to the above reactor over a period of 4 hours. After the addition, polymerization was further carried out for 4 hours. The conversion of monomer mixture (b) was 98%. Further, after addition of 7 parts of KPS, monomer mixture (c) was continuously added to the above reactor over a period of 4 hours. Then, polymerization was carried out further for 4 hours, and the temperature was lowered to 20° C. to obtain a latex-containing polymer particles. The conversion of monomer mixture (c) was 98%.

3 parts of styrene was added from the separating funnel to the thus obtained latex containing polymer particles, so as to soften the polymer particles. Immediately thereafter, 30 parts of aqueous 10% potassium hydroxide solution was added from the separating funnel, and thereafter, heating to 80° C. was continued for 3 hours (base treatment). Part of the latex was taken at this stage, and pH was measured at room temperature to be 10.

Then, 80 parts of aqueous 5% methacrylic acid and 50 parts of styrene were added, and the mixture was stirred at 80° C. for 3 hours (acid treatment). Part of the latex was taken at this stage, and pH was measured at room temperature to be 5.5.

After the acid treatment, 10 parts of aqueous 3% KPS solution was added, and the mixture of unreacted monomers was stirred at 80° C. for 2 hours to carry out copolymerization. Polymerization conversion at this final stage was 99%. The particle size and inner hole diameter of the obtained hollow polymer particles were observed and measured (photographic measurement). The results were shown in Table 2.

EXAMPLE 10 to 15

The same operations as in Example 9 were made to obtain a latex containing polymer particles, except that the compositions of monomer mixtures used for layers forming polymer particles and the rate of the seed particles were changed as shown in Table 2. Then, under conditions shown in Table 2, base treatment, acid treatment, and polymerization of the mixture of unreacted monomers were carried out. The results are shown Table 2 in a lump.

polymer obtained by copolymerizing a monomer containing no carboxyl group.

TABLE 2

|  |  | Example | | | | | | |
|---|---|---|---|---|---|---|---|---|
|  |  | 9 | 10 | 11 | 12 | 13 | 14 | 15 |
| Center layer (a) | Seed (part) | 0.3 | 0.3 | 0.3 | 0.3 | 0.3 | 0.3 | 0.1 |
|  | MMA (%) | 60 | 55 | 70 | 70 | 60 | 60 | 60 |
|  | BA (%) | 5 | 5 | 5 | 5 | 5 | 5 | 5 |
|  | MAA (%) | 35 | 40 | 25 | 25 | 35 | 0 | 35 |
|  | AA (%) | 0 | 0 | 0 | 0 | 0 | 35 | 0 |
|  | Center layer (part) | 5 | 3 | 20 | 10 | 5 | 5 | 5 |
| Intermediate layer (b) | MMA (%) | 85 | 85 | 87 | 79 | 85 | 0 | 85 |
|  | ST (%) | 0 | 0 | 0 | 0 | 0 | 85 | 0 |
|  | BA (%) | 10 | 10 | 10 | 10 | 10 | 10 | 10 |
|  | MAA (%) | 5 | 0 | 3 | 11 | 5 | 5 | 5 |
|  | AA (%) | 0 | 5 | 0 | 0 | 0 | 0 | 0 |
|  | Intermediate layer (part) | 45 | 47 | 30 | 40 | 50 | 45 | 45 |
| Surface layer (c) | ST (%) | 95 | 80 | 100 | 100 | 95 | 95 | 95 |
|  | MMA (%) | 5 | 20 | 0 | 0 | 5 | 5 | 5 |
|  | Surface layer (part) | 50 | 50 | 50 | 50 | 45 | 50 | 50 |
| Base treatment | KOH (part) | 3.0 | 3.0 | 4.0 | 4.5 | 2.0 | 7.5 | 3.0 |
|  | ST (part) | 3.0 | 3.0 | 3.0 | 3.0 | 3.0 | 3.0 | 3.0 |
|  | pH | 10.0 | 10.0 | 11.0 | 11.0 | 9.0 | 10.0 | 10.0 |
| Acid treatment | MAA (part) | 4.0 | 4.0 | 5.0 | 6.0 | 4.0 | 3.0 | 4.0 |
|  | ST (part) | 50 | 50 | 50 | 50 | 50 | 50 | 0 |
|  | pH | 5.5 | 5.5 | 5.5 | 5.5 | 5.5 | 6.0 | 5.5 |
| Characteristic | Mean particle size (nm) | 450 | 500 | 440 | 420 | 420 | 500 | 700 |
|  | Inner hole diameter (nm) | 390 | 440 | 350 | 330 | 340 | 430 | 630 |
|  | Shell thickness (nm) | 30 | 30 | 45 | 45 | 40 | 35 | 35 |

Note) AA: acrylic acid

It is seen from Table 2 that when latexes containing polymer particles having three-layer structure were used (Examples 9 to 15), hollow polymer particles having a shell thickness of 50 nm or less and a high percentage of void can be obtained.

As demonstrated above, according to this invention, it is possible to prepare stably a latex containing hollow polymer particles having a high glass transition temperature, and since it is unnecessary to use an organic solvent, it is possible to prepare a hollow polymer latex having only a small residual odor.

We claim:

1. A process for preparation of latex of a hollow polymer which comprises adding an alkali metal hydroxide, in the presence of a monomer, to latex containing carboxy-modified copolymer particles to make the pH of the latex 8 or more; adding a carboxyl group-containing monomer to make the pH of the latex 7 or less; and then polymerizing these monomers.

2. The process according to claim 1 wherein the carboxy-modified copolymer particles are polymer particles obtained by copolymerizing a monomer mixture of 0.1 to 40 wt. % of a carboxyl group-containing monomer and 99.9 to 60 wt. % of a monomer copolymerizable therewith.

3. The process according to claim 1 wherein the carboxy-modified copolymer particles are polymer particles comprising a center layer polymer obtained by copolymerizing a monomer mixture of 20 to 60 wt. % of a carboxyl group-containing monomer and 80 to 40 wt. % of a monomer copolymerizable therewith; an intermediate layer polymer obtained by copolymerizing a monomeric mixture of 1 to 12 wt. % of a carboxyl group-containing monomer and 99 to 88 wt. % of a monomer copolymerizable therewith; and surface layer polymer obtained by copolymerizing a monomer containing no carboxyl group.

4. The process according to claim 1 which prizes adding the base, in the presence of 1 to 20 weight parts of the monomer, per 100 weight parts of the carboxymodified copolymer particles to make the pH of the latex 8 or more.

5. The process according to claim 1 which comprises adding 0.5 to 20 weight parts of the carboxyl group-containing monomer per 100 weight parts of the carboxy-modified copolymer particles to make the pH of the latex 7 or less.

6. The process according to claim 3 wherein the weight ratio of the center layer polymer to the intermediate layer polymer is 1:99 to 50:50, and the weight ratio of the total quantity of the center layer polymer and the intermediate layer polymer to the surface layer polymer is 30:70 to 70:30.

7. The process according to claim 2 or 3 wherein the carboxyl group-containing monomer used for preparation of the carboxy-modified copolymer particles is an unsaturated carboxylic acid.

8. The process according to claim 2 or 3 wherein the monomer copolymerizable with the carboxyl group-containing monomer used for preparation of the carboxy-modified copolymer particles is an aromatic vinyl monomer or an unsaturated (meth)acrylic ester monomer.

9. A process for preparation of latex of a hollow polymer which comprises adding an alkali metal hydroxide, in the presence of a monomer, to latex containing carboxy-modified copolymer particles to make the pH of the latex 8 or more, wherein the carboxy-modified copolymer particles are polymer particles comprising a center layer polymer obtained by copolymerizing a monomer mixture of 20 to 50 wt. % of a carboxyl group-containing monomer and 80 to 40 wt. % of a monomer copolymerizable therewith; an intermediate layer polymer obtained by copolymerizing a monomer mixture of 1 to 12 wt. % of a carboxyl group-containing monomer and 99 to 88 wt. % of a monomer copolymerizable therewith; and surface layer polymer obtained by copolymerizing a monomer containing no carboxyl group; and adding a carboxyl group-containing monomer to make the pH of the latex 7 or less; and then polymerizing these monomers.

10. The process according to claim 9 wherein the weight ratio of the center layer polymer to the intermediate layer polymer is 1:99 to 50:50, and the weight ratio of the total quantity of the center layer polymer and the intermediate layer polymer to the surface layer polymer is 30:70 to 70:30.

11. The process according to claim 9 wherein the carboxyl group-containing monomer used for preparation of the carboxy-modified copolymer particles is an unsaturated carboxylic acid.

12. The process according to claim 9 wherein the monomer copolymerizable with the carboxyl group-containing monomer used for preparation of the carboxy-modified copolymer particles is an aromatic vinyl monomer or an unsaturated (meth)acrylic ester monomer.

* * * * *